United States Patent [19]
Goldstein

[11] Patent Number: 5,626,897
[45] Date of Patent: May 6, 1997

[54] CONICAL FOOD ARTICLE AND PROCESS FOR MAKING SAME

[75] Inventor: Ward J. Goldstein, Solana Beach, Calif.

[73] Assignee: Conewich Enterprises L.P., San Diego, Calif.

[21] Appl. No.: 450,488

[22] Filed: May 26, 1995

Related U.S. Application Data

[63] Continuation-in-part of Ser. No. 973,904, Nov. 20, 1992, abandoned, which is a continuation-in-part of Ser. No. 715,628, Jun. 14, 1991, abandoned.

[51] Int. Cl.⁶ ................................................. A21D 13/08
[52] U.S. Cl. .................... 426/139; 426/138; 426/139; 426/282; 426/283; 426/284; 426/293; 426/302; D1/118
[58] Field of Search ........................... 426/138, 282, 426/283, 284, 302

[56] References Cited

U.S. PATENT DOCUMENTS

| | | | |
|---|---|---|---|
| D. 92,261 | 5/1934 | Leaf | D1/118 |
| 1,854,091 | 4/1932 | Young | D1/118 |
| 4,150,935 | 4/1979 | Venzo | 425/305.1 |
| 4,783,338 | 11/1988 | Hayashi | 426/94 |
| 4,795,652 | 1/1989 | Cooper | 426/138 |
| 5,049,398 | 9/1991 | Saari et al. | 426/20 |

FOREIGN PATENT DOCUMENTS 0258936  9/1988  European Pat. Off. .......... A21C 3/00

*Primary Examiner*—Jeanette Hunter
*Assistant Examiner*—Lien Tran
*Attorney, Agent, or Firm*—Brown, Martin, Haller & McClain

[57] ABSTRACT

An edible food container is formed by wrapping an elongate flat strip of uncooked bread dough around a conically-shaped mandrel to form a plurality of spiral turns with an overlap between adjacent turns of the spiral. The resultant uncooked dough cone is then baked to form an edible, cone-shaped container of soft bread. The bread cone is removed from the mandrel and the hollow interior of the cone is filled with a selected filling.

10 Claims, 1 Drawing Sheet

CONICAL FOOD ARTICLE AND PROCESS FOR MAKING SAME

CROSS-REFERENCES TO RELATED APPLICATIONS

This application is a continuation-in-part of application Ser. No. 07/973,904 filed Nov. 20, 1992 now abandoned, which was a continuation-in-part of application Ser. No. 07/715,628 filed Jun. 14, 1991 (abandoned).

BACKGROUND OF THE INVENTION

The present invention relates to a conically-shaped edible food article and to a process for making such an article.

There are a number of common articles of food which are formed in a conical shape. One of the best known of these is the conical ice cream cone, which is generally formed by pouring liquid waffle dough into a mold or else forming a single sheet of dough into a cone shape. These types of dough form rigid, brittle shells.

U.S. Pat. No. 3,410,691 of Stanley describes a conical food article formed by cutting a flattened circle of dough into four equal segments or sector pieces, and wrapping an individual piece around a conical mandrel before baking. U.S. Pat. No. 4,795,652 of Cooper describes a similar technique in which a flattened strip of pretzel dough is cut into parallelogram-shaped pieces and each piece is wrapped onto a mandrel before baking.

SUMMARY OF THE INVENTION

It is an object of the present invention to provide a new and improved food article and process for making such an article.

According to one aspect of the present invention, a food article is provided which comprises a conical receptacle of soft bread dough formed by wrapping a strip of uncooked bread dough spirally around a conical mandrel starting at the widest end of the mandrel to form a plurality of successive spiral turns of the dough strip with an overlap between adjacent turns and adjacent turns adhered to one another by baking to form a contiguous conical structure with a hollow interior for receiving an edible filling.

According to another aspect of the present invention, a process for making such a food article is provided, which comprises the steps of forming a continuous, elongate strand of bread dough, winding the strand spirally around a conical mandrel starting at the widest end of the mandrel to form a plurality of adjacent spiral turns with an overlap between adjacent turns, and curing and cooking the wrapped spiral strand on the mandrel to form a conical receptacle of soft bread consistency.

Preferably, the strand is a flat strip and is wrapped with an overlap of around ⅓ to ½ the width of the strip between adjacent turns of the strip, so that the overlapping portions of adjacent turns will adhere to each other to form a sealed, integral conical receptacle.

This food receptacle can be made conveniently and economically, and can be filled with a variety of foods and eaten while being hand held. Since a soft, bread dough cone is formed, it can be used as a sandwich substitute which is particularly convenient and advantageous, since it avoids the problems of any filling spilling from the sides of a sandwich.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
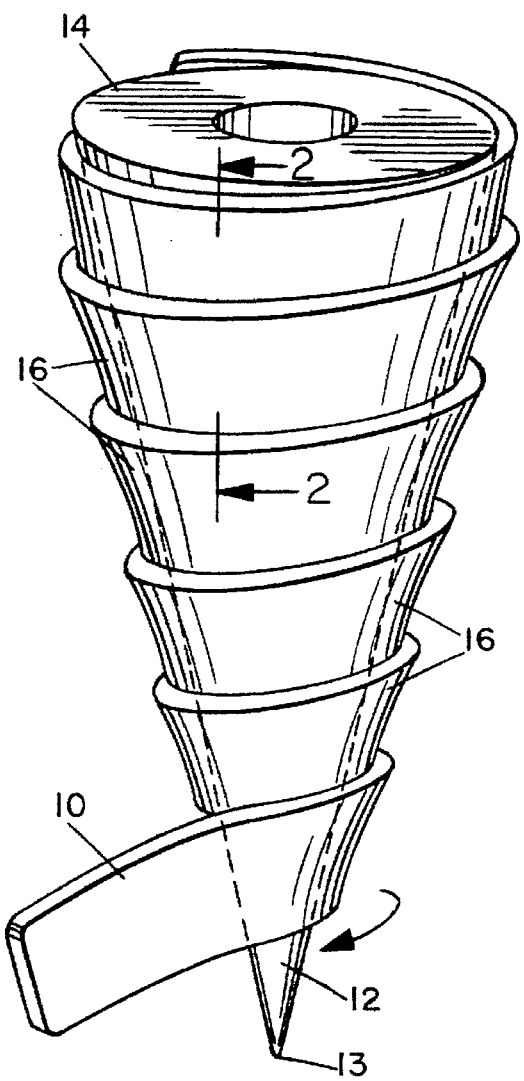
FIG. 1 is a pictorial view showing the cone being wound on a mandrel.
Figure 2:
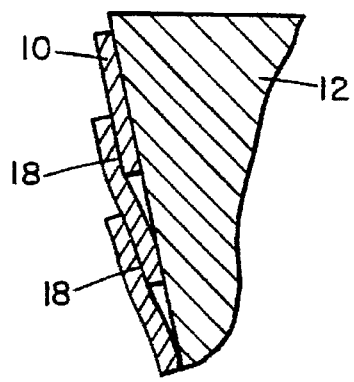
FIG. 2 is a sectional view taken on line 2—2 of FIG. 1.
Figure 3:
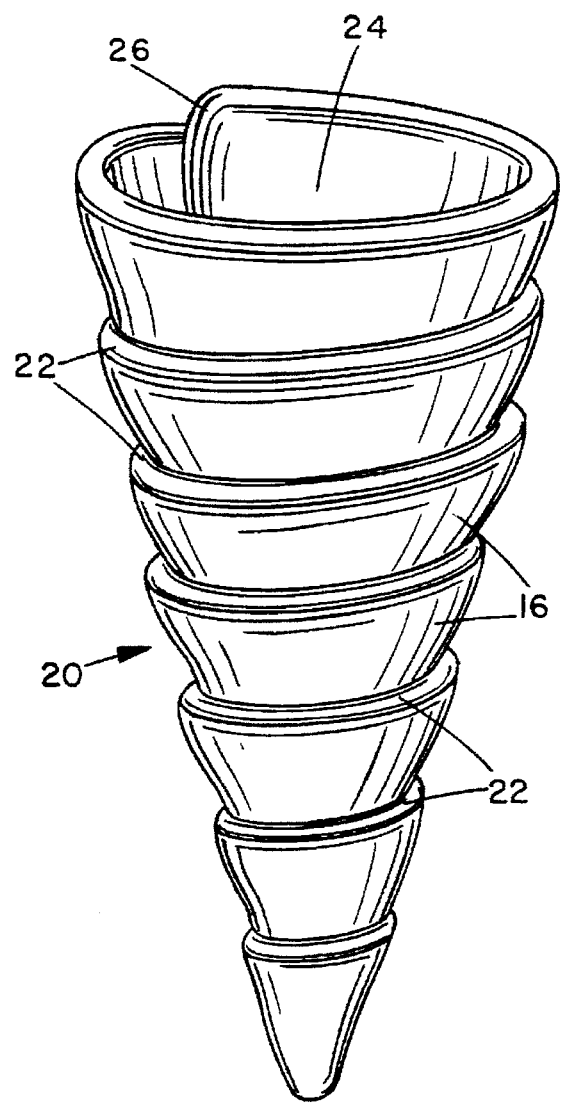
FIG. 3 illustrates the finished cooked product.

An edible food article and the process for making it according to a preferred embodiment of the present invention are illustrated in FIGS. 1, 2 and 3. The process basically comprises first mixing a bread dough in accordance with procedures which are well known in the art. Preferably, a high gluten flour is used for the dough. The bread dough is then formed into a relatively narrow, elongate flat strip or strand 10. Strip 10 is then wrapped spirally around a conically-shaped mandrel or baking pan 12 as best illustrated in FIG. 1, starting from the widest end 14 of the cone and wrapping to the apex 13 of the mandrel. The strip is stretched as it is wound onto the mandrel. By using high gluten flour, a more stretchy dough is produced, so that the strip can be stretched without breaking. Wrapping is continued until the lower part of the mandrel is covered, and adjacent turns 16 of the spiral are wrapped so that there is an overlap between them, as illustrated in FIG. 2, so as to form a contiguous conical structure.

The strips 10 may be formed in a number of different ways, both manual and automated. For example, a flat sheet of dough could be formed by rolling into a rectangular shape, and the sheet could then simply be cut into flat strips or strands in a similar manner to the making of flat noodles. Automated methods of pressing and stamping may be used. The strip 10 preferably has a thickness of ¼"±⅛", and a width of 1"±¼".

Although pressing of the dough on the mandrel is not necessary, some pressure may be applied if desired. The overlapping portions 18 of adjacent spiral turns will tend to adhere to one another due to the tension in the strip as it is wound, so that there are no gaps in the structure. Preferably, the adjacent turns are overlapped to a height of around ⅓ to ½ of the overall strip width or height. As illustrated in FIG. 1, the mandrel 12 has a bore or recess 19 in its flat or widest end 14 for receiving a suitable tool such as a post or spindle for holding the mandrel while the dough strand 10 is wrapped around it. The dough strip may be wound on the mandrel by hand or by a suitable automated machine.

The strip 10 of dough is preferably wound from the widest end of the cone to the apex, as illustrated in FIGS. 1 and 2. This has the advantage that the overlapping outer edge 22 faces upwardly rather than downwardly, reducing the risk of leakage of food from the cone. However, it may alternatively be wrapped in the opposite direction, starting at the apex and winding up to the widest end.

Once the dough strip has been spirally wrapped around the mandrel between its opposite ends, the uncooked dough cone is sprayed lightly with a solution of water, baking soda and cornstarch. The baking soda will create a brownish color in the outer surface of the product when cooked. The cornstarch helps to glue or cement the wrapped cone together. The sprayed cone is then baked in an oven while on the mandrel to form the finished product. The mandrel acts as a baking mold. As the dough is baked, the spiral turns will expand to adhere more firmly to one another and become more tightly wrapped, sealing the small opening at the apex of the cone. The cone is preferably baked in a steam generation oven. Steam is supplied to the oven during the initial phase of baking. Preferably, steam is supplied for a period of 30 seconds to one minute at the start of baking, with the oven set at 350° F. to 400° F. Baking is continued until the dough receptacle is baked to a golden brown, before removing from the oven. The baked, cone-shaped dough receptacle is then removed from the mandrel. The conical bread receptacle will have the soft consistency of baked bread, and will be essentially moisture-tight.

By adding a large amount of steam to the oven at the start of the baking process, the dough will be moistened and will be puffed up. The adhesion between overlapping turns of the strip is thereby increased substantially. Also, the need for proofing or allowing rising time before baking is eliminated. However, the amount of steam used is significantly more than in conventional dough steaming, in order to provide the desired adhesion and sealing between adjacent spiral turns of the strip. In normal baking, steam is supplied for only 15 seconds, whereas in this method, steam is supplied for at least 30 seconds.

As seen in FIG. 3, the baked, cone-shaped receptacle 20 will have a spirally extending, upwardly facing edge 22 extending on its outer surface marking the junction between adjacent turns of the dough strip. The receptacle has a soft bread consistency, and has an internal, conical recess 24 where selected sandwich fillings can be placed. Any selected filling may be used, such as meats, poultry, sea food, vegetables, dairy products and fruits, and the fillings may be hot or cold. The cone-shaped bread receptacle forms a sealed, edible container for the filling, reducing the risk of spilling and mess which can result when eating traditional sandwiches with open sides.

The bread cone or receptacle 20 is an extremely versatile food container and may be served as a container for breakfast, salad, lunch, dinner, snack or dessert, depending on the choice of bread dough used and the selected food filling. It may be made in a range of different sizes for holding snacks or full meals, for example. The bread cone itself and the fillings can be consumed without the need of any eating utensils, making it extremely useful as a portable meal-in-one. In view of the way the dough strip is wrapped on the mandrel, the baked receptacle is unlikely to unwind as it is eaten, since the upper end 26 of the strip is on the inside of the cone, further reducing the risk of food leaking or dripping from the receptacle.

Although a preferred embodiment of the invention is described above by way of example only, it will be understood by those skilled in the field that modifications may be made to the disclosed embodiment without departing from the scope of the present invention, which is defined by the appended claims.

I claim:

1. A process for making an edible food container, comprising the steps of:

forming an uncooked flat strip of uncooked bread dough;

winding the elongate strip of uncooked bread dough spirally around a conical mandrel starting at the widest end of the mandrel to form a plurality of successive spiral turns of the dough strip along the height of the mandrel up to the apex of the mandrel, with an overlap of predetermined height between each pair of adjacent spiral turns along the entire length of the mandrel;

applying a coating comprising a mixture of water, baking soda and cornstarch to the surface of the wrapped spiral strip prior to baking whereby the baking soda will give a brownish color to the outer surface of the container after baking and the cornstarch helps to seal the overlaps; and cooking the wrapped spiral strip on the mandrel in an oven cooking cycle, to form a bread cone having the consistency of soft bread which is resistant to liquid leakage out of the cone, the bread cone comprising means for receiving any selected savory or sweet filling.

2. The process as claimed in claim 1, wherein an overlap of between ⅓ to ½ of the width of the strip is provided between adjacent turns.

3. The process as claimed in claim 1, wherein the strip is stretched continuously as it is wound on the mandrel.

4. The process as claimed in claim 1, including the step of supplying steam to the oven for a predetermined time period at the start of the cooking cycle.

5. The process as claimed in claim 4, wherein the time period is in the range from 30 seconds to one minute.

6. The process as claimed in claim 5, wherein the oven temperature is in the range from 350° F. to 400° F.

7. An edible food container, comprising:

a hollow cone of baked bread dough having the soft consistency of baked bread, the cone having an open upper end which is the widest end of the cone and a sealed, lower end which is the apex of the cone;

the cone having a sealing layer on its outer surface, the sealing layer comprising a coating of water, baking soda and cornstarch applied to the cone prior to baking, and comprising means for resisting leakage of liquid from the cone;

the cone comprising an elongate, flat strip of bread dough wound spirally into a conical shape with an overlap between each pair of adjacent spiral turns along the entire length of the cone from said upper end to said apex, and adjacent turns being adhered to one another by baking to form a contiguous conical structure whereby the baking soda gives a brownish color to the outer surface of the cone nad the cornstarch helps to seal the overlaps;

the cone having a hollow interior for receiving any selected edible filling; and the spiral windings starting at the widest, upper end of the cone and extending to the apex of the cone, with an overlap edge between adjacent turns facing towards the upper end of the cone.

8. The container as claimed in claim 7, wherein the strip has a thickness in the range from ⅛ to ⅜.

9. The container as claimed in claim 7, wherein the strip has a width in the range from 0.75" to 1.25".

10. An edible food container, comprising:

a hollow cone of baked bread dough having the soft consistency of baked bread, the cone having an open, upper end which is the widest end of the cone and a sealed, lower end which is the apex of the cone;

the cone comprising an elongate flat strip of bread dough wound spirally into a conical shape with an overlap between each pair of adjacent spiral turns along the entire length of the cone from said upper end to said lower end and adjacent turns adhered to one another by baking to form a contiguous conical structure;

the cone having a sealing layer on its outer surface, the sealing layer comprising a coating of water, baking soda and cornstarch applied to the cone prior to baking whereby the baking soda will give a brownish color to the cone after baking and the cornstarch helps to seal the overlaps;

the overlap having a height in the range of ⅓ to ½ of the width of the dough strip;

the cone having a hollow interior for receiving any selected edible filling; and the spiral windings starting at the widest, upper end of the cone and extending to the apex of the cone, with an overlap edge between adjacent turns facing towards the upper end of the cone, said upwardly facing overlap edge comprising means for resisting leakage of liquid filling from the container.

* * * * *